United States Patent
Vlaznev et al.

(10) Patent No.: US 11,281,774 B2
(45) Date of Patent: Mar. 22, 2022

(54) SYSTEM AND METHOD OF OPTIMIZING ANTIVIRUS SCANNING OF FILES ON VIRTUAL MACHINES

(71) Applicant: AO Kaspersky Lab, Moscow (RU)

(72) Inventors: Denis O. Vlaznev, Moscow (RU);
Alexander S. Saliev, Moscow (RU);
Alexander V. Sizov, Moscow (RU);
Ilya B. Godunov, Moscow (RU); Igor O. Pavlov, Moscow (RU); Evgeny S. Semenov, Moscow (RU)

(73) Assignee: AO Kaspersky Lab, Moscow (RU)

(*) Notice: Subject to any disclaimer, the term of this patent is extended or adjusted under 35 U.S.C. 154(b) by 439 days.

(21) Appl. No.: 16/452,811

(22) Filed: Jun. 26, 2019

(65) Prior Publication Data

US 2020/0210571 A1    Jul. 2, 2020

(30) Foreign Application Priority Data

Dec. 28, 2018 (RU) .......................... RU2018147226

(51) Int. Cl.
*G06F 21/00* (2013.01)
*G06F 21/56* (2013.01)
*G06F 9/455* (2018.01)

(52) U.S. Cl.
CPC ........ *G06F 21/561* (2013.01); *G06F 9/45558* (2013.01); *G06F 21/565* (2013.01); *G06F 2009/45591* (2013.01); *G06F 2221/034* (2013.01)

(58) Field of Classification Search
CPC .. G06F 21/561; G06F 9/45558; G06F 21/565; G06F 2009/45591; G06F 2221/034
USPC .......................................................... 726/24
See application file for complete search history.

(56) References Cited

U.S. PATENT DOCUMENTS

| | | | | |
|---|---|---|---|---|
| 7,523,343 | B2* | 4/2009 | Leis | G06F 11/0727 714/5.11 |
| 8,607,066 | B1* | 12/2013 | Kailash | G06F 21/564 713/188 |
| 9,202,050 | B1* | 12/2015 | Nachenberg | G06F 21/56 |
| 9,286,310 | B1* | 3/2016 | Emelyanov | G06F 16/172 |
| 9,679,139 | B1* | 6/2017 | Monastyrsky | G06F 21/53 |
| 10,719,372 | B2* | 7/2020 | Kolachala | G06F 9/522 |
| 2010/0031353 | A1* | 2/2010 | Thomas | G06F 11/3604 726/22 |

(Continued)

*Primary Examiner* — Josnel Jeudy
(74) *Attorney, Agent, or Firm* — Arent Fox LLP; Michael Fainberg (57) ABSTRACT

Disclosed herein are systems and methods for optimizing antivirus scanning of files on virtual machines. In one aspect, an exemplary method comprises, determining whether there is a record about a file in a verdict cache, when there is, assigning the verdict found in the verdict cache to the file, and when no record is found in the verdict cache, determining whether the file is currently being scanned in a parallel thread, when the file is currently being scanned in a parallel thread, blocking the scanning of the file until the scanning in the parallel thread is completed, and placing a result of the scanning in the parallel thread in the verdict cache, and when the file is not currently being scanned in a parallel thread, performing the scanning of the file on a current thread, and placing a result of the scanning on the current thread in the verdict cache.

21 Claims, 4 Drawing Sheets

(56) References Cited

U.S. PATENT DOCUMENTS

| | | | | |
|---|---|---|---|---|
| 2014/0123280 A1* | 5/2014 | Kedma | .................. | G06F 21/56 726/23 |
| 2016/0092686 A1* | 3/2016 | Barlett | ................. | G06F 21/604 726/22 |
| 2020/0004965 A1* | 1/2020 | Vlaznev | ............... | G06F 21/564 |

* cited by examiner

SYSTEM AND METHOD OF OPTIMIZING ANTIVIRUS SCANNING OF FILES ON VIRTUAL MACHINES

CROSS REFERENCE TO RELATED APPLICATIONS

The present application claims priority to Russian Patent Application No. 2018147226, filed on Dec. 28, 2018, the entire content of which is incorporated herein by reference.

FIELD OF TECHNOLOGY

The present disclosure relates to the field of computer security, more specifically, to systems and methods for optimizing antivirus scanning of files on virtual machines by de-duplicating file scanning.

BACKGROUND

Virtual machines have become ubiquitous in today's networks. A virtual machine (VM) is a software environment which virtualizes a computing environment inside a physical machine (such as a computer or server). The physical machine is also known as the "host machine".

The virtualized environment enables isolation of operations the programs from those of the operating system, including the work of the BIOS, the processor (CPU), the RAM, the hard disk drive, and peripheral devices. Thus, the virtual machine provides an imitation of a physical machine inside another physical machine. Moreover, if the virtual machine, just like the physical machine, has its own operating system, then the operating system of the virtual machine can be different from the operating system of the physical machine. In fact, it is possible to create, on a single physical machine, a virtual computing environment containing several virtual machines at the same time. During their respective operations, the virtual machines make use of the computing resources of the same host machine, the control of which is provided with the aid of a monitor of the virtual machines.

The monitor of virtual machines is also known as a hypervisor. The hypervisor ensures that the virtual machines deployed on a host machine can operate in parallel, i.e., simultaneously. The hypervisor also controls the computing resources of the host machine, dividing up the computing resources among all the virtual machines. Thus, the hypervisor allots a certain number of resources to each virtual machine. In turn, each virtual machine utilizes the allotted resources, both for performing tasks of its own operating system and tasks of a user. In addition, the hypervisor may provide the virtual machines with communications capabilities for interacting with each other. For example, the hypervisor may provide, to the virtual machines, network connections that enable the virtual machines to communicate as if they were separate physical machines.

Moreover, a virtual machine, like any physical machine, e.g., a computer system, is vulnerable to attacks by malicious software. Consequently, there is a need for an antivirus system for the protection of virtual machines. Various approaches can be used to solve this problem. The first approach is an approach in which the protection of the virtual machines is deployed in a decentralized manner on the host machine. The decentralization involves running the antivirus software on each virtual machine. The second approach organizes the protection in a way opposite to that of the first approach. In the second approach, the protection is centralized, and security tasks are handled by a single virtual security device embedded in the virtual environment on the host machine. Moreover, there are other approaches that utilize a combination of the two aforementioned approaches.

In the context of any approach to organize the protection of virtual machines, one of the main challenges for the security industry is the optimization of the usage of resources of the host machine by the security subsystem. Some approaches for addressing the optimization problem include: foregoing unnecessary scans, spreading out of the scanning operations over time, or deduplication (from the Latin deduplicatio—removal of duplicates) of file scans. All of these optimization techniques enable a more economical utilization of the computing resources of the host machine. However, all of the techniques also have drawbacks. For example, existing solutions that enable one to avoid repeating a scan on identical files, use a cached file scanning result only if a preceding scanning was completed. Otherwise, a new scanning will be done, regardless of the fact that a scanning of precisely the same file may already be in progress at the current moment. Consequently, the new scanning doubles the consumption of resources and results in a needless waste of the computing resources of the disk subsystem, memory, and processor.

Thus, there is a need for a more optimal solution for antivirus scanning of virtual machines.

SUMMARY

Aspects of the disclosure relate to the field of computer security, more specifically to systems and methods for optimizing antivirus scanning of virtual machines by de-duplicating file scanning.

In one exemplary aspect, a method for optimizing antivirus scanning of files on virtual machines by de-duplicating file scanning is implemented in a computer comprising a hardware processor, the method comprising: determining whether or not there is a record about a file of the files on the virtual machines in a verdict cache, when there is a record in the verdict cache about the file, assigning the verdict found in the verdict cache to the file, and when no record about the file is found in the verdict cache, determining whether or not the file is currently being scanned in a parallel thread, when the file is currently being scanned in a parallel thread, blocking the scanning of the file until the scanning of the file in the parallel thread is completed, and placing a result of the scanning of the file in the parallel thread in the verdict cache, and when the file is not currently being scanned in a parallel thread, performing the scanning of the file on a current thread, and placing a result of the scanning on the current thread in the verdict cache.

According to one aspect of the disclosure, a system is provided for optimizing antivirus scanning of files on virtual machines by de-duplicating file scanning, the system comprising a hardware processor configured to: determine whether or not there is a record about a file in a verdict cache, when there is a record in the verdict cache about the file, assign the verdict found in the verdict cache to the file, and when no record about the file is found in the verdict cache, determine whether or not the file is currently being scanned in a parallel thread, when the file is currently being scanned in a parallel thread, block the scanning of the file until the scanning of the file in the parallel thread is completed, and place a result of the scanning of the file in the parallel thread in the verdict cache, and when the file is not currently being scanned in a parallel thread, perform the scanning of the file on a current thread, and place a result of the scanning on the current thread in the verdict cache.

In one exemplary aspect, a non-transitory computer-readable medium is provided storing a set of instructions thereon for optimizing antivirus scanning of files on virtual machines by de-duplicating file scanning, wherein the set of instructions comprises instructions for: determining whether or not there is a record about a file in a verdict cache, when there is a record in the verdict cache about the file, assigning the verdict found in the verdict cache to the file, and when no record about the file is found in the verdict cache, determining whether or not the file is currently being scanned in a parallel thread, when the file is currently being scanned in a parallel thread, blocking the scanning of the file until the scanning of the file in the parallel thread is completed, and placing a result of the scanning of the file in the parallel thread in the verdict cache, and when the file is not currently being scanned in a parallel thread, performing the scanning of the file on a current thread, and placing a result of the scanning on the current thread in the verdict cache.

In one aspect of the present disclosure, the verdict cache is common to all threads.

In another aspect, the optimization of the antivirus scanning of files is performed by a scanning subsystem that is realized in a form of a separate virtual machine.

In another aspect, a file is determined as being identical to another file, when identifiers of the file and another file match.

In another aspect, the identifier of the file is a hash sum which is calculated by a mathematical transformation of content of the file and/or its metadata of the file.

In one aspect, the record about the file located in the verdict cache includes at least an identifier of the file, and a verdict associated with the file that was scanned.

In one aspect, the verdict cache is used for: storing information on results of antivirus scannings of files, and enabling a signaling indicating that a given file is undergoing an antivirus scan.

In one aspect, the method of the present disclosure optimizes the antivirus scanning by avoiding a parallel scanning of identical files in a virtual environment. The method is designed to reduce the workload on a scanning subsystem—thereby reducing the computing resources being used by the scanning subsystem.

The method of the present disclosure advantageously enables a more effective solution for optimizing antivirus scanning techniques for protecting virtual machines. The method addresses the problem of duplicating scans of files. In one aspect, the method of the present disclosure performs, by a scanning subsystem, antivirus scanning of files on one or more computer systems and gives verdicts as to whether or not the scanned files are malicious.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for optimizing antivirus scanning of files on virtual machines by de-duplicating file scanning. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, the following approach has been used for the numbering: when the number of an object occurs in the description that does not have a letter associated with it, then the statement being described pertains to all objects containing that numerical part. For example, the term "virtual machine 103" in the description refers to any of the virtual machines: 103a, 103b, . . . , 103n. In contrast, when a complete numbering is given in the description of an object, then the description pertains to the specific object in the figure (for example, the physical/host machine 100).

The present system is designed for performing, by the scanning subsystem, antivirus scanning of files on one or more computer systems and giving verdicts as to whether or not the scanned files are malicious.

Figure 1:
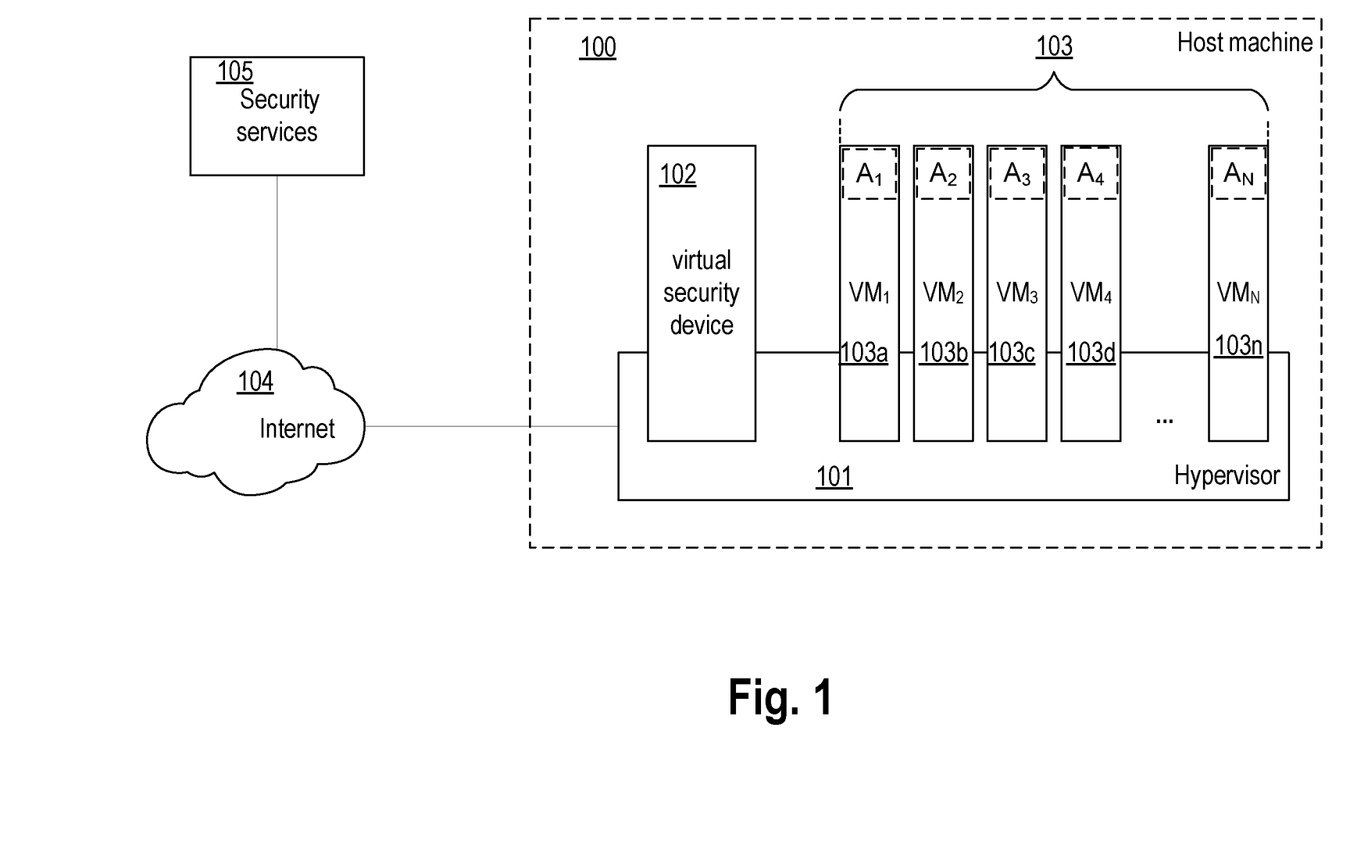
FIG. 1 illustrates an example of a virtual environment deployed on a host machine in accordance with aspect of the present disclosure.

FIG. 1 illustrates an example of a virtual environment deployed on a host machine 100 in accordance with aspect of the present disclosure. In one aspect, the host machine 100 may comprise a cluster of servers, a server, or a computer device having sufficient computing resources for the deployment of a virtual environment containing a set of virtual machines 103 {VM1, VM2, VM3, VM4, . . . , VMN}. The elements of the set of virtual machines 103 {VM1, VM2, VM3, VM4, . . . , VMN} are shown in FIG. 1 as elements 103a, 103b, . . . , 103n. The set of virtual machines 103 may include dozens of virtual machines (hereafter, VM) or more. In one aspect, the virtual environment may be a corporate (local area) network. Each virtual machine 103 is designed to have a guest operating system (client OS) to run on the virtual machine. The guest operating system may be necessary for operation performed both for the user and for file servers and/or web servers.

It is noted that the client OS may be different (for example, Microsoft Windows, Linux, Mac OS) on each virtual machine 103. The type of client OS for a given virtual machine depends on the needs of a user of the particular virtual machine. The hardware configuration needed for performing tasks of each virtual machine 103 may also be different. In one aspect, the hardware configuration includes a number of allocated resources (memory volume, hard disk size, number of processor cores, number of processors, and so forth) of the host machine 100.

In one aspect, the protection of a virtual environment against malicious programs is provided by a scanning subsystem, realized in the form of a separate virtual machine—a virtual security device 102, which is designed for the centralized execution of antivirus scanning tasks. It should be noted that the virtual security device 102 is essentially the same kind of virtual machine as the virtual machine 103, except that it is provided, as mentioned above, for the performance of the antivirus scanning tasks. The virtual security device 102 relieves the virtual machine 103 of the workload of locally performed resource-hungry operations needed for antivirus scanning tasks. In turn, the workloads of both the virtual machines 103 themselves and those of the host machine 100 are reduced. For example, the use of a virtual security device 102 to carry out the antivirus scanning method for signature analysis of files substantially reduces the workload on the resources of the host machine 100; in particular it reduces the number of disk operations (working with the hard disk) and the use of memory. The virtual security device 102 may contain a functionality for conducting both a more simple type of antivirus scan (such as signature analysis of files, based on a comparing of hash sums) and a more complex one—thereby enabling a more detailed analysis (for example by using an expert system, based on analysis of the actions occurring). The functionality of the scanning subsystem depends on the settings of the antivirus system, which are generally set up during the embedding of that system in the virtual environment. It should be noted that the functionality of the virtual security device 102 may change over time, for example, due to a change in the number of allocated computing resources of the host machine 100.

In order to enable the all of the virtual machines 103 and the virtual security device 102 to work simultaneously, the host machine 100 contains a hypervisor 101. The hypervisor 101 is designed to ensure the isolation of one virtual machine from another virtual machine, to control (regulate) the computing resources of the host machine 100, and to divide up those computing resources among all the virtual machines 103 and the virtual security device 102. The regulating of the computing resources enables all virtual machines to work without freezing or delay, even though all the virtual machines are using the same computing resources of the host machine 100. For example, in the case of several virtual machines working simultaneously with a data storage medium (such as a hard disk), the hypervisor 101 must form an access queue to the data storage medium. This is because, even though special areas on the hard disk have been allocated to each virtual machine 103, data input/output operations occur with the aid of an identical element (such as a disk head). Furthermore, the hypervisor 101 provides communication and interaction capabilities to the virtual machines 103 so they are able to communicate with each other, as if the virtual machines 103 were physical computer devices. The hypervisor 101 also enables the data of the virtual machines 103 to access the virtual security device 102. As a rule, the code of the hypervisor 101 is executed at the level of the core of the host machine 100.

Furthermore, the hypervisor 101 may also control access to the outside network (external network), for example, to the Internet 104. Therefore, the virtual machine 103 and the virtual security device have the ability to interact when necessary with external servers and services via the hypervisor 101, for example, with security services 105 of an antivirus company. The security services 105 may include any infrastructure elements of the antivirus company which are used by the virtual security device 102 remotely. That is, they reside on remote servers of the antivirus company, and are designed, for example, to present software updates or information about malicious files to the virtual security device 102. Furthermore, the interaction of the virtual security device 102 with the security services 105 takes place via the hypervisor 101.

As mentioned above, the hypervisor 101 makes possible access of the virtual security device 102 to the data of the virtual machines 103 (for example, to the files). Furthermore, the virtual security device 102 may interact with the virtual machine 103 by the use of agents $\{A_1, A_2, \ldots, A_N\}$ (agent-based) or without the use of agents (agentless). The first approach presumes the presence of an agent installed on each virtual machine 103. The agent makes it possible to perform those security functions requiring a local presence on the virtual machine, such as: monitoring of RAM, monitoring of applications, anti-phishing, antivirus scanning of the contents of emails, web pages, and IM (Instant Messaging), and others. The presence of an agent makes it possible to request antivirus scanning of any file on the virtual machine from the virtual security device 102. For example, at the instant when a user or indeed a process is attempting to open a file, the agent intercepts access to the file and sends a request for antivirus scanning of the file to the virtual security device 102. Having received this request, the virtual security device 102 accesses the file through the hypervisor 101 and performs the antivirus scanning thereof. In one aspect, each agent, just like the virtual security device, is a scanning subsystem able to completely or partially perform antivirus scan tasks locally on each of virtual machines 103. The second approach does not presume the presence of agents installed on the virtual machines 103. Thus, all security functions (such as the full antivirus scanning of the virtual machines 103) are performed in a centralized manner solely with the aid of the virtual security device 102.

Figure 2:
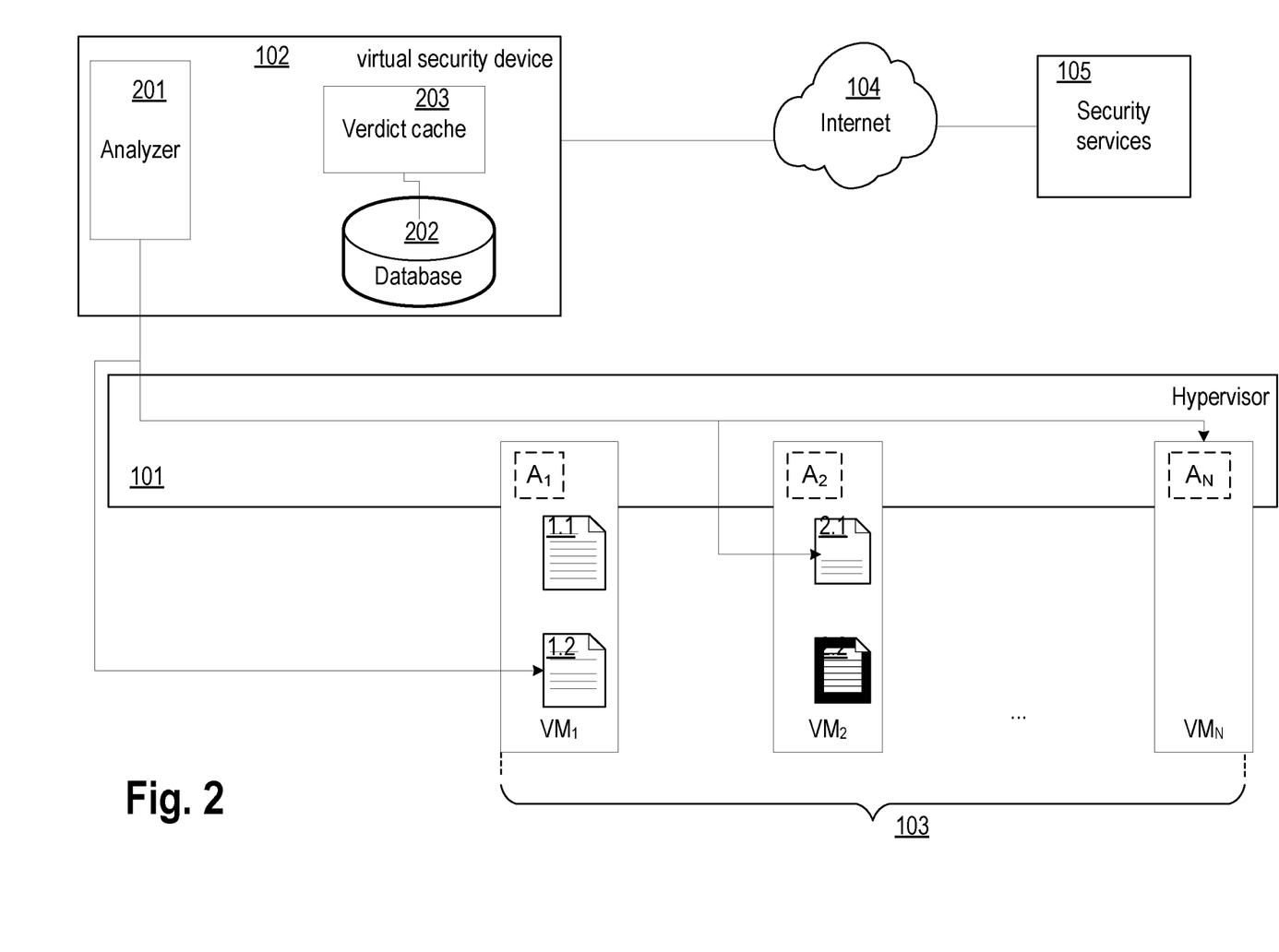
FIG. 2 illustrates an example of a diagram of a scanning subsystem within a virtual environment in accordance with aspect of the present disclosure.

FIG. 2 illustrates an example of a diagram of a scanning subsystem within a virtual environment. In one aspect, the scanning subsystem is represented by the virtual security device 102. One feature of this scanning subsystem of the present disclosure is that, when performing a complete antivirus scanning of the virtual machines 103 $\{VM_1, VM_2, \ldots, VM_N\}$, the scanning of the present disclosure reduces the workload on the computing resources of the host machine 100 by preventing a parallel scanning of identical files.

In a preferred aspect, the virtual security device 102 consists of an analyzer 201, a database 202, and a centralized verdict cache 203 (hereinafter, simply verdict cache).

The database 202 is designed to store the necessary information for performing the tasks of the scanning subsystem (the virtual security device 102) and, in particular, the tasks of the analyzer 201.

In one aspect, the information stored in the database 202 may include at least information about types of files, lists of trusted and untrusted applications, heuristic rules (for example, event analysis rules), and information about the results of previous scans.

In one aspect, the verdict cache 203 is used for: storing information on results of the antivirus scanning of files, and enabling a signaling of the fact that a file is undergoing an antivirus scan.

In one aspect, the information about the results of previous scans includes at least an identifier of each file of the files that are scanned, and a verdict associated with each file that is scanned.

In one aspect, the identifier of the file that is scanned is a hash of the file (the hash sum of the file). The hash of the file is a unique identifier of the file, calculated by the scanning subsystem through certain mathematical transformations of the information contained in the file and (or) the attributes of the file (file name, size, date of creation/modification, and so on).

In one aspect, the verdict comprises a status (e.g., a clean file or a malicious file) assigned to the file, wherein the status is determined in accordance with a result of an antivirus scan of the scanning subsystem.

In one aspect, the analyzer 201 is configured to perform an analysis of files in order to determine the harmfulness of the files. For each file, the analysis is performed with the aid of antivirus scanning technologies. For example, any number and types of scanning technologies may be installed during a deployment of the security subsystem.

It should be noted that the analyzer 201 may include any number of contemporary and known approaches for checking objects to determine whether a malicious code is present in the object. Malicious code (or malicious software) includes a code, during the execution of which, is designed to obtain unauthorized access to resources of a computing device (the host machine 100 or any virtual machine 103) or to information being kept on the computing device.

The antivirus scanning methods of the analyzer 201 may include a method for performing at least one of: —a signature analysis; —an analysis based on comparing hash values of an analyzed object with hash values of known malicious objects; —an analysis of an object based on an events log, the events log containing all events occurring during an emulation of a code of the object; and —an analysis of an object in a safe isolated environment (a sandbox), the analysis of the object in the safe isolated environment including execution of the object in the safe isolated environment.

In various aspects, the analyzer 201 may utilize either all of the above-listed antivirus scan methods or only a subset of them.

In one aspect, the virtual security device 102 also contains a database updater (not present in FIG. 2). The database updater is designed for automatic updating of the database 202. In order to update the database, the database updater is linked to an external update service (for example, to the security service 105) via the Internet 104. The database updater interacts with the external update service to receive the necessary information. Since the method of the present disclosure works in a virtual environment, the link to the Internet 104 will occur via the hypervisor 101. Furthermore, the analyzer 201 may interact, at the same time, with more than one virtual machine 103, carrying out parallel antivirus scans of files, and forming a list of file processing threads.

In one aspect, information from the list of file processing threads allows the analyzer 201 to determine whether or not a file is being processed at the present moment in a parallel thread. In one aspect, the list of file processing threads includes at least: for each file being scanned, an identifier of the file, an identifier of a file processing thread for the file, and a scan completion status (the course of the performance of the scan).

The virtual security device 102, with the aid of the analyzer 201 and prior to performing the antivirus scan of the file, calculates the identifier of the file and searches in the verdict cache 203 for the presence of a verdict of a previously performed antivirus scan of the file. If a verdict is found in the verdict cache 203, the verdict that is found is inherited by the file in the context of the current antivirus scan, while the scan itself will not be performed. That is, the scanning is not repeated in the current antivirus scan; however, the result of the previous scan which is found in the verdict cache is used to determine a status for the file.

In another aspect, if there is no verdict for the file being scanned in the verdict cache 203, the analyzer 201 will proceed to a determination as to whether the same file is being processed at the present moment by the scanning subsystem in a parallel thread. If the same file is being processed in a parallel thread, the current antivirus scanning of the file will be blocked by the analyzer 201 to await for the conclusion of the processing of that file in the parallel thread. Upon completion of the antivirus scanning of the file in that parallel thread, the results of the scan will be applied to the file the antivirus scanning of which was blocked by the analyzer 201, and no scanning will be done for that file.

In another aspect, the analyzer 201 uses the computing resources allocated within the thread that was blocked for the antivirus scanning of the next file, and upon completion of the processing of the same file in the parallel thread the verdict will be applied to the given file.

To illustrate by way of an example, suppose upon deployment of the virtual environment on the host machine 100, a number of virtual machines were created. Suppose also some of the created virtual machines, i.e., the subset 103 $\{VM_1, VM_2, \ldots, VM_N\}$, were created from a shared virtual image. Identical operating systems and a set of applications were installed on the virtual machines 103. Thus, there are many identical files on the virtual machines 103.

A virtual security device 102 is provided to ensure security within the deployed virtual environment. Communication and interaction among the virtual machines 103, as well as access of the virtual security device 102 to the data of the virtual machines 103, are provided by a hypervisor 101. When the set of virtual machines from the virtual machines 103 are running at the same time, the virtual security device 102 (scanning subsystem) must carry out tasks for complete antivirus scanning of all of the virtual machines 103 being scanned. The virtual security device 102 performs the scanning of the files on the virtual machines 103 at the same time, in parallel threads with the aid of analyzer 201. To speed up the scanning process, the analyzer 201 uses a verdicts cache 203 and also checks whether a processing of identical files is taking place in parallel threads. Thus, before performing a antivirus scan, the analyzer 201 calculates the identifiers of the files 1.1 and 2.1, performs a search in the verdict cache 203 for the presence of verdicts of a previously performed antivirus scan. For the file 1.1, the verdict cache 203 contains a verdict that this file is clean. For the file 2.1 there is no verdict.

After determining that an antivirus scan for this file is not taking place in a parallel thread, the analyzer 201 commences the antivirus scanning of the file 2.1. The analyzer 201 applies the known verdict from the verdict cache 203 to the file 1.1 and moves on to the antivirus scanning of the next file 1.2. The files 2.1 and 1.2 are identical files. Therefore, upon moving on to file 1.2, the analyzer 201 discovers that an antivirus scan is already being performed for this same file 2.1 in a parallel thread and blocks the processing of the file 1.2, waiting for the completion of the antivirus scan of the file 2.1. Upon completion of the processing of the file 2.1, the analyzer 201 applies the verdict to the file 1.2 and moves on to the antivirus scanning of the next file 2.2.

In one aspect, the scanning subsystem uses the approach discussed below to determine whether a file is being processed in a parallel thread at the present moment. In the context of this approach, a centralized list of files being scanned at the present moment is not used. Instead, a synchronization object is established for each file being scanned in a centralized verdict cache, by which it is possible to signal the completion of the scanning. The synchronization objects are part of a thread synchronization mechanism making it possible for the threads to coordinate their work with shared resources in the framework of operating systems with preemptive multitasking. This mechanism constitutes a set of objects of the operating system which are: created and controlled by software, are shared by all the threads in the system (several of them for threads belonging to the same process), and are used for coordinating access to resources. The resources may be anything which can be shared by two or more threads—a file, a port, an entry in a database (such as the verdict cache) and even a global program variable (which may be accessible from threads belonging to the same process).

Let us consider the use of synchronization objects by way of an example. On the virtual machine $VM_1$ an agent $A_1$ intercepts access to the file "file.exe" (file 2.1). The agent $A_1$ sends a request for a verdict as to the file "file.exe" to the centralized verdict cache 203 on the virtual security device 102. The centralized verdict cache 203 determines that there is no verdict for the file and there is no synchronization object. A synchronization object is generated, associated with a record in the verdict cache 203 for the file "file.exe", and the identifier of the synchronization object and a flag indicating the need to conduct a scanning of the file are returned to the agent $A_1$. The agent $A_1$ commences the scanning of the file "file.exe" by itself (the agent $A_1$ plays the part of the scanning subsystem) or with the aid of the analyzer 201 of the virtual security device 102 (the scanning subsystem is the virtual security device 102). On the virtual machine $VM_2$ an agent $A_2$ (or indeed another thread on the agent $A_1$) intercepts access to the file "file.exe" (file 2.1 for the agent $A_2$) and sends to the centralized verdict cache 203 a request for a verdict as to the given file "file.exe". The verdict cache 203 determines there is no verdict for the file, but there is a synchronization object associated with the cache record for the file "file.exe". The identifier of the synchronization object and a flag indicating the need to wait for the result of the scanning of the file are returned to the agent $A_2$. The agent $A_2$ waits for the end of the scanning of the file, using the obtained identifier of the synchronization object. Furthermore, in one aspect, the waiting time is limited by an extendable timeout. The agent $A_1$ completes the scanning of the file "file.exe", sends the obtained verdict to the centralized verdict cache 203 and signals the completion of the scanning, using the identifier of the synchronization object. The agent $A_2$ completes the waiting on the synchronization object and obtains the verdict for the file "file.exe" from the centralized cache.

Figure 3:
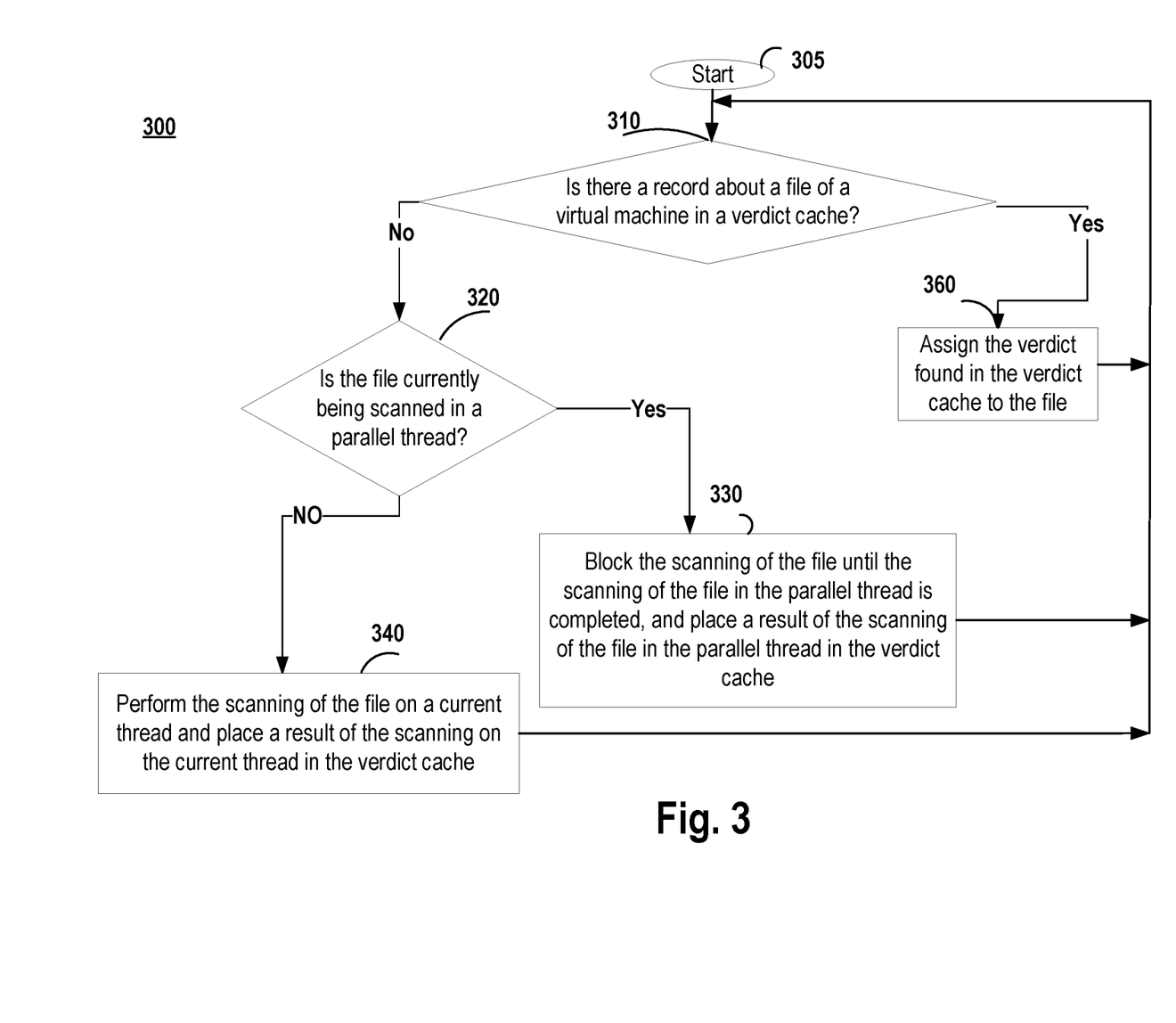
FIG. 3 illustrates a method for optimizing antivirus scanning of virtual machines in accordance with aspect of the present disclosure.

FIG. 3 illustrates a method 300 for optimizing antivirus scanning of files on virtual machines in accordance with aspect of the present disclosure. Method 300 starts in step 305 and proceeds to step 310.

In step 310, method 300 determines whether or not there is a record about a file in a verdict cache. The file, for which the method determines whether or not there is a record in the verdict cache, is one of the files stored on one of the virtual machines. When there is a record in the verdict cache about the file, the method proceeds to step 360. Where no record about the file is found in the verdict cache, the method proceeds to step 320.

In step 320, method 300 determines whether or not the file is currently being scanned in a parallel thread. The parallel thread is an antivirus scanning of another file on any computer system, i.e., by the scanning subsystem. When the file is currently being scanned in a parallel thread, the method proceeds to step 330. When the file is not currently being scanned in a parallel thread, the method proceeds to step 340.

In step 330, method 300 blocks the scanning of the file until the scanning of the file in the parallel thread is completed, and places a result of the scanning of the file in the parallel thread in the verdict cache. The method then returns to step 310.

In step 340, method 300 performs the scanning of the file on a current thread and places a result of the scanning on the current thread in the verdict cache. The method then proceeds to step 310.

In step 360, method 300 assigns the verdict found in the verdict cache to the file. For example, a verdict indicating that the file is malicious may be found in the verdict cache. In another example, a verdict indicating that the file is safe may be found in the verdict cache. The method then returns to step 310.

In one aspect of the present disclosure, the verdict cache is common to all threads.

In another aspect, the computer system is a virtual machine.

In another aspect, a file is determined as being identical to another file, when identifiers of the file and another file match.

In another aspect, the identifier of the file is a hash sum which is calculated by a mathematical transformation of content of the file and/or its metadata of the file.

In one aspect, the record about the file located in the verdict cache includes at least an identifier of the file, and a verdict associated with the file that was scanned.

In one aspect, the verdict cache is used for: storing information on results of antivirus scannings of files, and enabling a signaling indicating that a given file is undergoing an antivirus scan.

Figure 4:
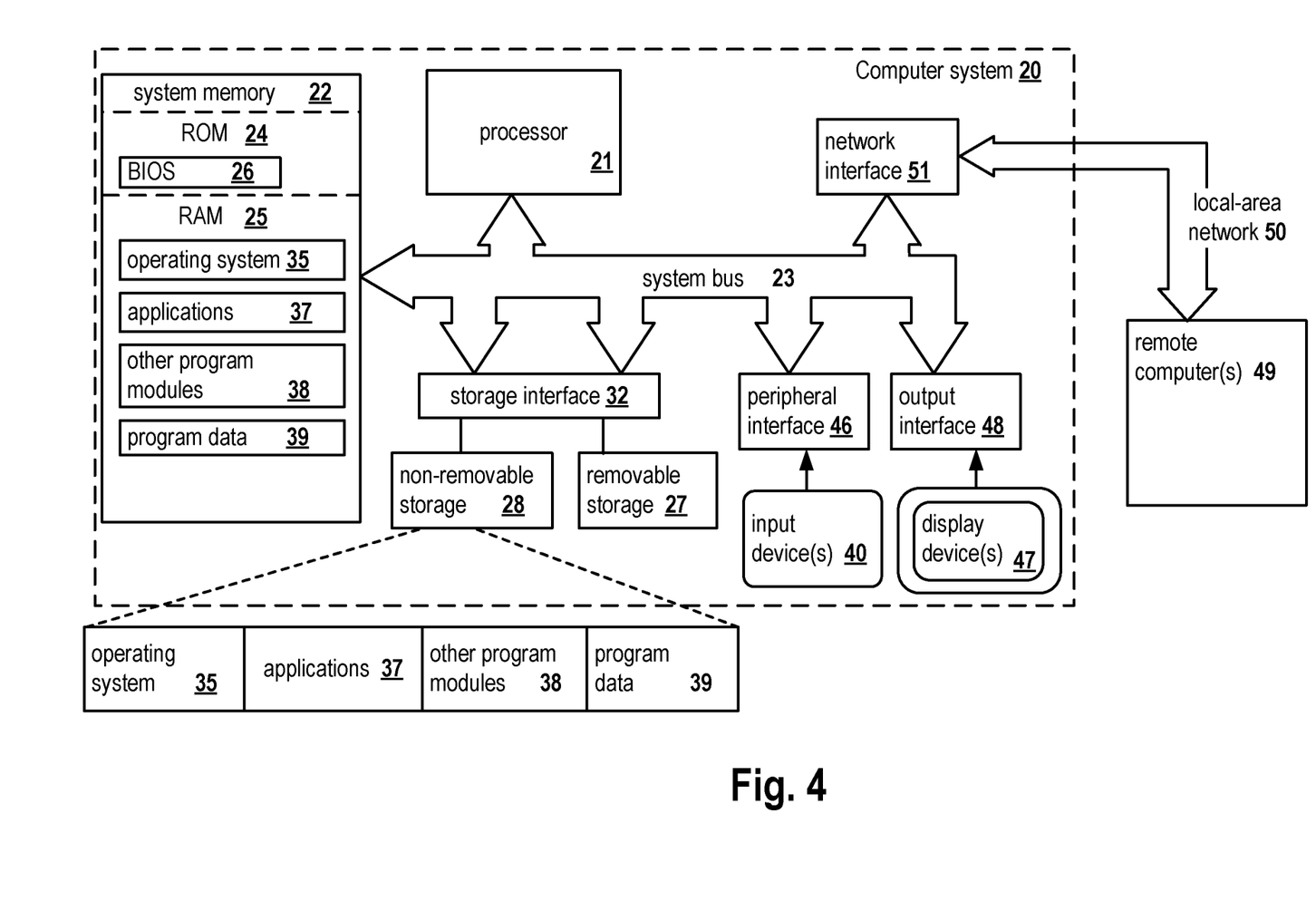
FIG. 4 presents an example of a general purpose computer system on which aspects of the present disclosure can be implemented.

FIG. 4 is a block diagram illustrating a computer system 20 on which aspects of systems and methods for optimizing antivirus scanning of files on virtual machines, may be implemented in accordance with exemplary aspects. It should be noted that the computer system 20 can correspond to a virtual security device 102, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for optimizing antivirus scanning of files on virtual machines, the method comprising:
    determining whether or not there is a record of a file on a virtual machine in a verdict cache;
    when there is a record in the verdict cache about the file, assigning the verdict found in the verdict cache to the file; and
    when no record about the file is found in the verdict cache,
        determining whether or not the file is currently being scanned in a parallel thread;
        when the file is currently being scanned in a parallel thread, blocking the scanning of the file until the scanning of the file in the parallel thread is completed, and placing a result of the scanning of the file in the parallel thread in the verdict cache; and
        when the file is not currently being scanned in a parallel thread, performing the scanning of the file on a current thread, and placing a result of the scanning on the current thread in the verdict cache.

2. The method of claim 1, wherein the verdict cache is common to all threads.

3. The method of claim 1, wherein the optimization of the antivirus scanning of files is performed by a scanning subsystem that is realized in a form of a separate virtual machine.

4. The method of claim 1, wherein a file is determined as being identical to another file, when identifiers of the file and another file match.

5. The method of claim 4, wherein the identifier of the file is a hash sum which is calculated by a mathematical transformation of content of the file and/or its metadata of the file.

6. The method of claim 1, wherein the record about the file located in the verdict cache includes at least an identifier of the file, and a verdict associated with the file that was scanned.

7. The method of claim 1, wherein the verdict cache is used for: storing information on results of antivirus scannings of files, and enabling a signaling indicating that a given file is undergoing an antivirus scan.

8. A system for optimizing antivirus scanning of files on virtual machines, comprising:
    at least one hardware processor configured to:
        determine whether or not there is a record of a file on a virtual machine in a verdict cache;
        when there is a record in the verdict cache about the file, assign the verdict found in the verdict cache to the file; and
        when no record about the file is found in the verdict cache,
            determine whether or not the file is currently being scanned in a parallel thread;
            when the file is currently being scanned in a parallel thread, block the scanning of the file until the scanning of the file in the parallel thread is completed, and place a result of the scanning of the file in the parallel thread in the verdict cache; and
            when the file is not currently being scanned in a parallel thread, perform the scanning of the file on a current thread, and place a result of the scanning on the current thread in the verdict cache.

9. The system of claim 8, wherein the verdict cache is common to all threads.

10. The system of claim 8, wherein the optimization of the antivirus scanning of files is performed by a scanning subsystem that is realized in a form of a separate virtual machine.

11. The system of claim 8, wherein a file is determined as being identical to another file, when identifiers of the file and another file match.

12. The system of claim 11, wherein the identifier of the file is a hash sum which is calculated by a mathematical transformation of content of the file and/or its metadata of the file.

13. The system of claim 8, wherein the record about the file located in the verdict cache includes at least an identifier of the file, and a verdict associated with the file that was scanned.

14. The system of claim 8, wherein the verdict cache is used for: storing information on results of antivirus scannings of files, and enabling a signaling indicating that a given file is undergoing an antivirus scan.

15. A non-transitory computer readable medium storing thereon computer executable instructions for optimizing antivirus scanning of files on virtual machines, including instructions for:
    determining whether or not there is a record about a file on virtual machine in a verdict cache;

when there is a record in the verdict cache about the file, assigning the verdict found in the verdict cache to the file; and when no record about the file is found in the verdict cache, determining whether or not the file is currently being scanned in a parallel thread;

when the file is currently being scanned in a parallel thread, blocking the scanning of the file until the scanning of the file in the parallel thread is completed, and placing a result of the scanning of the file in the parallel thread in the verdict cache; and when the file is not currently being scanned in a parallel thread, performing the scanning of the file on a current thread, and placing a result of the scanning on the current thread in the verdict cache.

16. The non-transitory computer readable medium of claim 15, wherein the verdict cache is common to all threads.

17. The non-transitory computer readable medium of claim 15, wherein the optimization of the antivirus scanning of files is performed by a scanning subsystem that is realized in a form of a separate virtual machine.

18. The non-transitory computer readable medium of claim 15, wherein a file is determined as being identical to another file, when identifiers of the file and another file match.

19. The non-transitory computer readable medium of claim 18, wherein the identifier of the file is a hash sum which is calculated by a mathematical transformation of content of the file and/or its metadata of the file.

20. The non-transitory computer readable medium of claim 15, wherein the record about the file located in the verdict cache includes at least an identifier of the file, and a verdict associated with the file that was scanned.

21. The non-transitory computer readable medium of claim 15, wherein the verdict cache is used for: storing information on results of antivirus scans of files, and enabling a signaling indicating that a given file is undergoing an antivirus scan.

* * * * *